(12) United States Patent
Molloy et al.

(10) Patent No.: US 7,171,668 B2
(45) Date of Patent: Jan. 30, 2007

(54) AUTOMATIC DATA INTERPRETATION AND IMPLEMENTATION USING PERFORMANCE CAPACITY MANAGEMENT FRAMEWORK OVER MANY SERVERS

(75) Inventors: Christopher L Molloy, Raleigh, NC (US); Gary M Quesenberry, Clayton, NC (US); Robert Robinson, Creedmoor, NC (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 10/023,154

(22) Filed: Dec. 17, 2001

(65) Prior Publication Data

US 2003/0115244 A1   Jun. 19, 2003

(51) Int. Cl.
  *G06F 9/46* (2006.01)
  *G06F 15/173* (2006.01)

(52) U.S. Cl. ............................ 718/105; 709/226
(58) Field of Classification Search ........... 395/183.19; 709/226; 718/104, 105
  See application file for complete search history.

(56) References Cited

U.S. PATENT DOCUMENTS

| | | | |
|---|---|---|---|
| 4,823,286 A | 4/1989 | Lumelsky | |
| 5,719,854 A * | 2/1998 | Choudhury et al. | 370/231 |
| 5,848,270 A * | 12/1998 | DeLuca et al. | 718/105 |
| 5,872,911 A * | 2/1999 | Berg | 714/43 |
| 5,911,048 A | 6/1999 | Graf | |
| 6,078,924 A | 6/2000 | Ainsbury et al. | |
| 6,148,335 A | 11/2000 | Haggard et al. | |
| 6,453,353 B1 | 9/2002 | Win et al. | |
| 6,571,288 B1 * | 5/2003 | Sarukkai | 709/226 |
| 6,694,288 B2 * | 2/2004 | Smocha et al. | 702/186 |
| 2002/0116441 A1 | 8/2002 | Ding et al. | |

FOREIGN PATENT DOCUMENTS

WO   WO 00/58903   10/2000

OTHER PUBLICATIONS

Howard Lambert, Paul Matthews; *Distributed Intelligence When Handling Queues and Messages Within Queues in Pervasive Client/Server Environments*, Abstract Research Disclosure, Jul. 2000, Article No. 435143, p. 1282.

(Continued)

*Primary Examiner*—Meng-Al T. An
*Assistant Examiner*—Camquy Truong
(74) *Attorney, Agent, or Firm*—DeLio & Peterson, LLC; Peter W. Peterson; Jay H. Anderson

(57) ABSTRACT

An automated method of managing computing resources having a workload of a given type comprises providing resource data collectors for collecting data regarding performance of the resources, such as a server network, in accordance with the type of workload; developing a forecast of utilization of the resources, based on historical performance data; and collecting real-time performance data regarding the resources running under the workload. The method then includes analyzing the performance data and the forecast to identify a critical resource; and automatically adjusting a capacity of the resource to provide steady-state performance of the resource under the workload. Additional hardware resources such as CPUs, computer memory and computer disk storage are initially available to, but unused by, the computing resources.

15 Claims, 4 Drawing Sheets

OTHER PUBLICATIONS

L.J. O'Connor, A. Schade; *A Universal Data Transport Method*; Abstract, Research Disclosure, Sep. 1999, Article No. 425101, p. 1255.

C. Critani, C. Proietti, D. Angeletti, P. Jansen; Abstract: *An Expert System To Assist in Performance Evaluation Of A Complex Main frame-based Computer Site*; Eleventh International Conference, Expert Systems and their Applications Conference, May 1991.

O. Olatidoye, S. Sarathy, G. Jones, E. Mason, L. Milligan, R. Namburu, A. Tentner; Abstract: *Integrated CAD-FEM Methods For Interpretation and Assessment of Structural Response Data*; Proceedings of the High Performance Computing Symposium, Apr. 1999.

* cited by examiner

AUTOMATIC DATA INTERPRETATION AND IMPLEMENTATION USING PERFORMANCE CAPACITY MANAGEMENT FRAMEWORK OVER MANY SERVERS

BACKGROUND OF THE INVENTION

1. Field of the Invention

The present invention relates generally to computer systems and, in particular, to a method of adding critical hardware resource capacity to a networked system of computers.

2. Description of Related Art

As described in U.S. Pat. No. 6,148,335, the disclosure of which is incorporated herein by reference, a generalized client-server computing network has a plurality of servers and which are interconnected, either directly to each other or indirectly through one of the other servers. Each server is essentially a stand-alone computer system (having one or more processors, memory devices, and communications devices), but has been adapted (programmed) for the primary purpose of providing information to individual users at a plurality of workstation clients in communication with each server. A client is a member of a class or group of computers or computer systems that uses the services of another class or group to which it is not related. As used herein, "client" generally refers to any multi-purpose or limited-purpose computer adapted for use by a single individual, regardless of the manufacturer, hardware platform, operating system, and the like. The information provided by a server can be in the form of programs which run locally on a given client, or in the form of data such as files used by other programs.

Such networks may communicate via the Internet using conventional protocols and services which allow the transfer of various types of information, including electronic mail, simple file transfers via FTP, remote computing via TELNET, gopher searching, Usenet newsgroups, and hypertext file delivery and multimedia streaming via the World Wide Web (WWW). A given server can be dedicated to performing one of these operations, or running multiple services. The '335 patent discloses the monitoring of server performance in a network like the Internet, and generating reports detailing performance statistics (daily, weekly, or monthly) for various server resources. Statistical parameters may include for example the number of observations; CPU utilization; system usage percentage; user usage percentage; percentage of time I/O wait is greater than some pre-selected level; run queue length; active virtual memory (AVM); free space (FRE); percentage of time CPU utilization is greater than some pre-selected level; percentage of time run queue is greater than some pre-selected level; percentage of time storage usage is greater than some preselected level and percentage of time paging rate is greater than some number of pages per second. Links may be provided to view additional, detailed information regarding, for example, a specific resource on a particular server. Notwithstanding the advantages of the invention of the '335 patent, there is no method or system which may act on the performance information generated on the client-server computer network to improve the performance and reliability of the network.

SUMMARY OF THE INVENTION

Bearing in mind the problems and deficiencies of the prior art, it is therefore an object of the present invention to provide a method of monitoring and controlling network computer resources.

It is another object of the present invention to provide a method of managing computing resources on a network to improve the network's performance and reliability.

A further object of the invention is to provide a method by which critical hardware resource conditions may be addressed without direct user input.

Still other objects and advantages of the invention will in part be obvious and will in part be apparent from the specification.

The above and other objects and advantages, which will be apparent to one of skill in the art, are achieved in the present invention which is directed to, in a first aspect, an automated method of managing computing resources having a workload of a given type. The method comprises providing resource data collectors for collecting data regarding performance of the resources, in accordance with the type of workload; developing a forecast of utilization of the resources, based on historical performance data; and collecting real-time performance data regarding the resources running under the workload. The method then includes analyzing the performance data and the forecast to identify a critical resource and automatically adjusting a capacity of the resource to provide steady-state performance of the resource under the workload.

In another aspect, the present invention is directed to a program storage device readable by a machine, tangibly embodying a program of instructions executable by the machine to perform an automated method of managing computing resources having a workload of a given type, using resource data collectors for collecting data regarding performance of the resources in accordance with the type of workload, and a forecast of utilization of the resources based on historical performance data. The method steps comprise collecting real-time performance data regarding the resources running under the workload, analyzing the performance data and the forecast to identify a critical resource, and automatically adjusting a capacity of the resource to provide steady-state performance of the resource under the workload.

In both of the above aspects of the invention, the resources preferably comprise a server network. The method may further comprise setting threshold values for the performance data and identifying the resource in accordance with the threshold values. The method may also comprise notifying a user of the computing resources when the critical resource is a hardware resource, and notifying the user when the capacity of the hardware resource is adjusted. Preferably, the method further includes initially providing additional hardware resources available to, but unused by, the computing resources. Such additional hardware resources may be selected from the group consisting of CPUs, computer memory and computer disk storage.

In yet another aspect, the present invention is directed to a computer program product for performing an automated method of managing computing resources having a workload of a given type, using resource data collectors for collecting data regarding performance of the resources in accordance with the type of workload, and a forecast of utilization of the resources based on historical performance data. The computer program product has computer-readable program code for collecting real-time performance data regarding the resources running under the workload, computer-readable program code for analyzing the performance data and the forecast to identify a critical resource, and computer-readable program code for automatically adjusting a capacity of the resource to provide steady-state performance of the resource under the workload.

As before, in this aspect the resources preferably comprise a server network. There may be initially provided additional hardware resources available to, but unused by, the computing resources. Such additional hardware resources may be selected from the group consisting of CPUs, computer memory and computer disk storage. The computer program product may further comprise computer-readable program code for setting threshold values for the performance data and computer-readable program code for identifying the resource in accordance with the threshold values. The computer program product may also comprise computer-readable program code for notifying a user of the computing resources when the critical resource is a hardware resource, and computer-readable program code for notifying the user when the capacity of the hardware resource is adjusted.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

Figure 1:
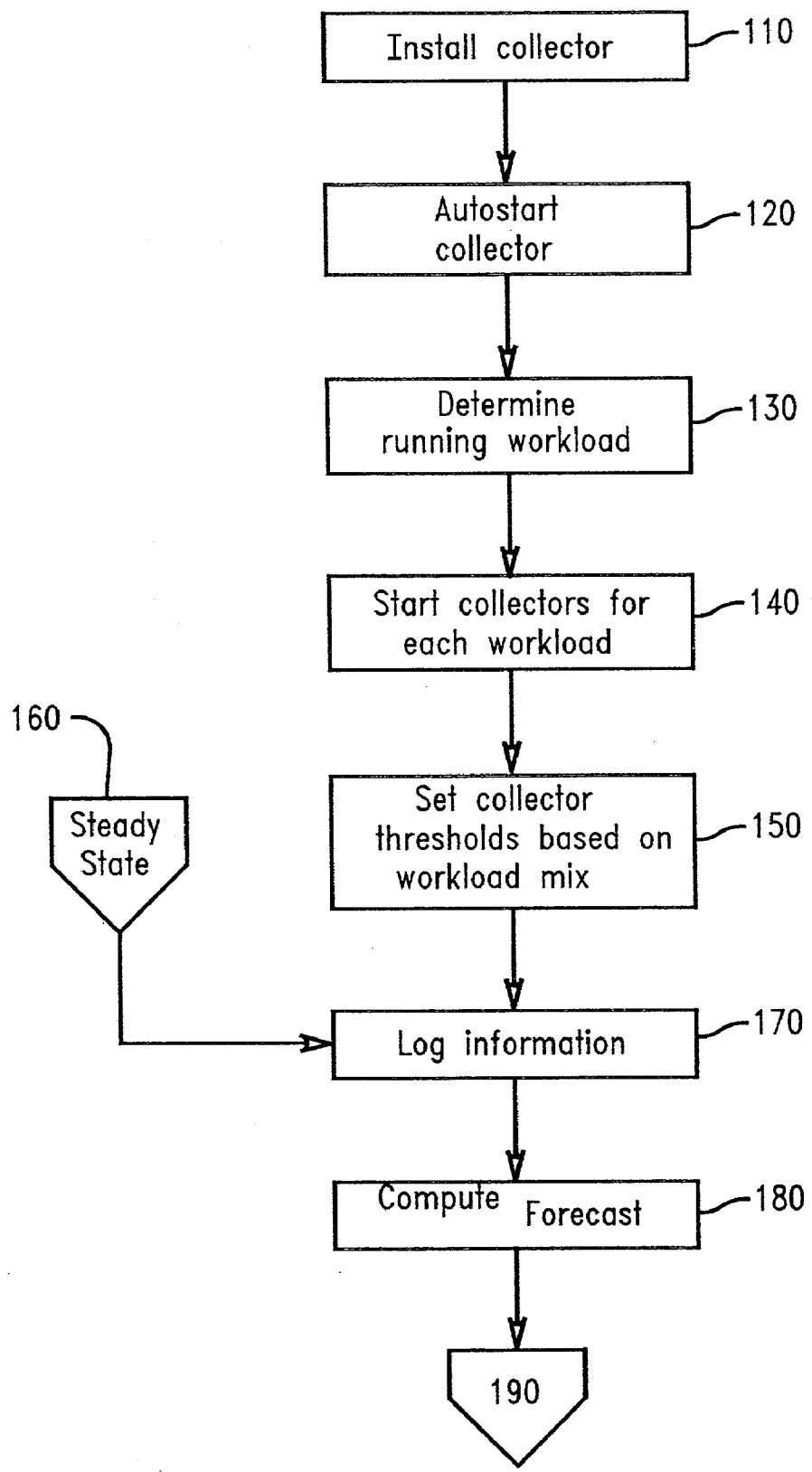
FIG. 1 is a flow chart of a portion of the preferred method of practicing the present invention.

DESCRIPTION OF THE PREFERRED
EMBODIMENT(S)

In describing the preferred embodiment of the present invention, reference will be made herein to FIGS. 1–4 of the drawings in which like numerals refer to like features of the invention. Features of the invention are not necessarily shown to scale in the drawings.

The present invention is particularly useful in connection with the successful server resource management (SRM) methodology defined in the aforementioned U.S. Pat. No. 6,148,335, whereby server resources are measured across multiple platforms and server trends reported by enterprise and/or server-level drill-down navigation using red/yellow/green report presentation. An online "red action list" of action plan and status is also reported. The automatic data interpretation of the present invention adds a layer of benefit by implementing a set of automatic actions based on pre-defined correlation algorithms. When managing hundreds of installed machines, associated support costs are reduced through use of this management automation and alert methodology. In general, the present invention takes available server resource metrics for hardware resources such as central processing unit (CPU), memory and disk storage and develop framework to automatically determine a set of actions based on measured conditions. This invention forms a closed loop whereby data is not only collected and reported at face-value, but also enables a set of recommendations or actions to be taken against the available data, saving analysis labor and intervention. The present invention provides a method to use capacity on demand to add capacity automatically to the computer system, and to notify the user, e.g., the system manager or system analyst, when hardware capacity is added.

The present invention expands on the '335 patent and expands the list of actions to automatically recommend or implement capacity planning alternatives, such that the primary focus is server capacity planning. The present invention interprets server metrics and workload resource data across platforms, and is not limited to mainframe data; it automatically determines a set of actions based on measured conditions, and uses statistical data and deduction techniques to perform the automation. The method and system of present invention are particularly directed to monitoring and analyzing server management data, as opposed to the business data on the server. The present invention uses expected resources metric feeds and supports systems management of servers and/or Information Technology (I/T) machines; automatic interpretation is performed on the expected (server historical) data and rules set implemented; and uses relational database to archive the server history.

Figure 2:
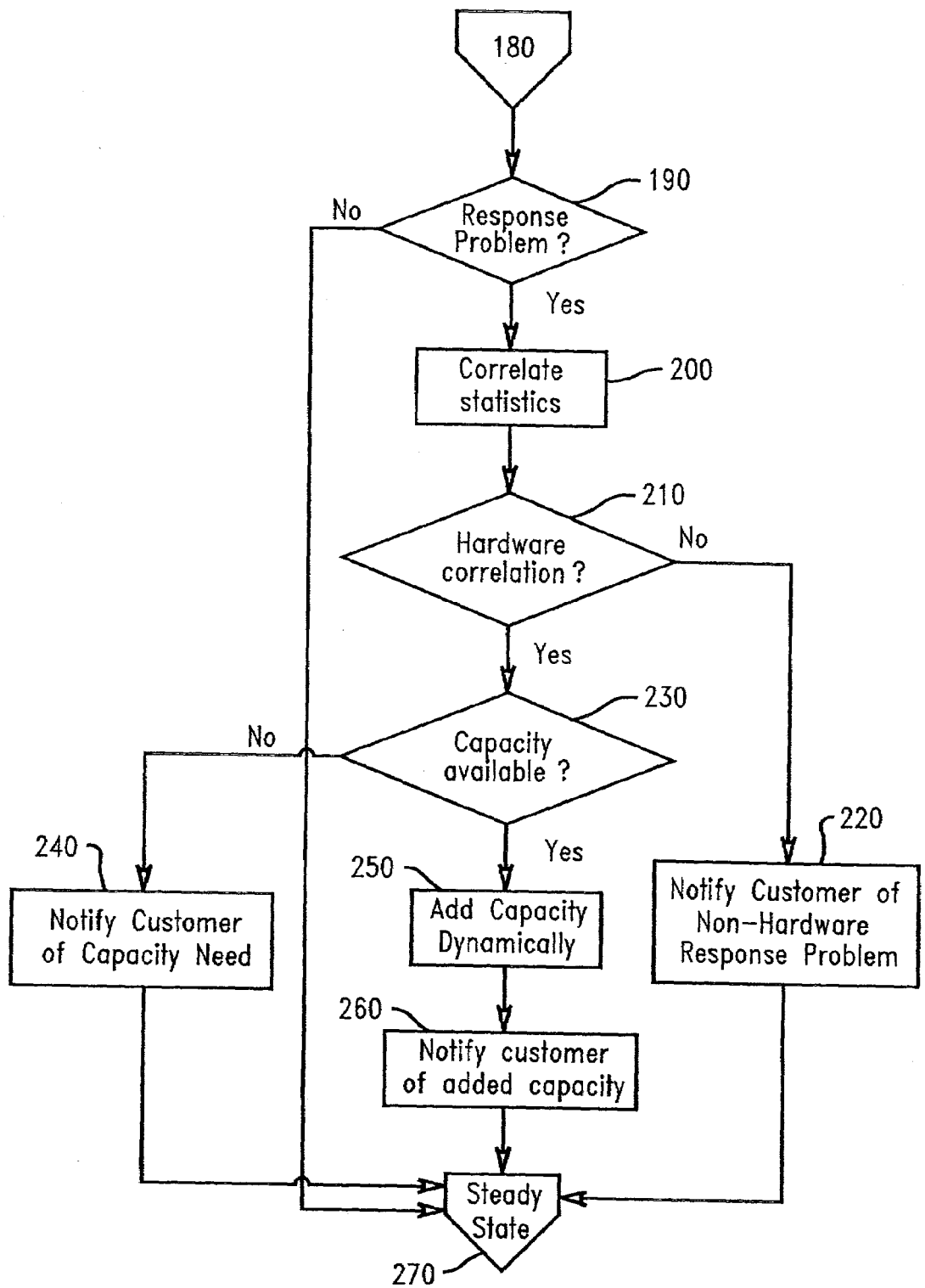
FIG. 2 is a continuation of the flow chart of FIG. 1 showing the preferred method of practicing the present invention.

The method of the present invention may be described in detail in connection with the flowcharts shown in FIGS. 1 and 2. Initially, in step 110, server resource collectors are installed in the server system to collect data regarding performance of the server resources and threshold values for the performance data are defined. In subsequent steps, the system begins collecting and logging steady state server metrics by first starting the data collection process 120, determining the running workload of the server system 130, starting the data collection for each workload 140, and setting the collector threshold based on the workload mix 150. The workloads and workload mix may be any combination of system and/or application processes such as web hosting, database hosting, file serving, security checking, batch processing, financial systems, network management, systems management, numerical and statistical analysis, online processing, and the like. Using the historical (as opposed to real-time) steady state server data measurements as input 160, the method then develops a metrics associated with CPU usage and thresholds to determine the need for additional CPU capacity.

Based on the information previously collected and the forecast computed, the method then determines whether there are any response or resource bottlenecks 190. These are determined using specific platform metrics, such as page rate, run queue, scan rate, out-and-ready, swap rate; I/O rates, disk utilization, and the like. The server system response time is measured and statistics are correlated 200 to determine the threshold values to be set for use of the hardware resources. For example, disk storage capacity threshold values may be set at some percentage of available disk space, or CPU usage may be set at some percentage of maximum usage. If threshold exceptions are found, then the method determines whether hardware resources are an impact 210. If no hardware contention correlation is found, then the customer is notified of response time threshold exceptions 220, with no hardware issues detected. If the critical resource capacity is available on-demand 230, then such capacity is adjusted, i.e., added dynamically to the server 250, and the customer is notified of action taken 260. If a hardware resource contention is detected, i.e., a critical resource, and no additional hardware capacity is available, then the customer is notified of need for capacity 240. If no response time or hardware resource exceptions are detected, then regular steady state conditions 270 continue and the process continues again: (a) log date; (b) analyze and correlate data; (c) activate automation policy or alerting, as necessary; (d) notify customer of actions or resource status; and (e) continue steady state.

Figure 3:
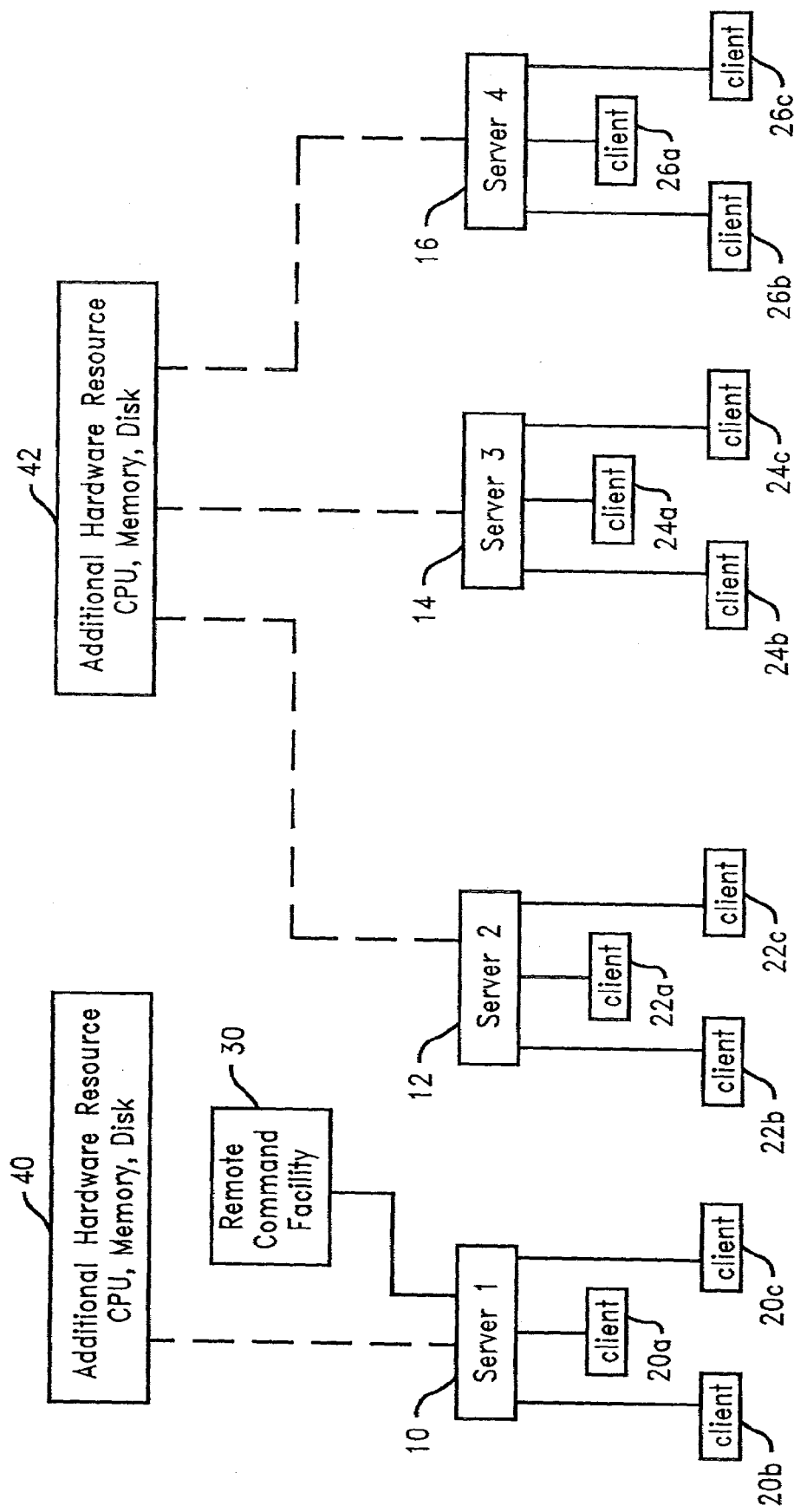
FIG. 3 is a schematic of one embodiment of a computer client/server network employing the method of the present invention.
Figure 4:
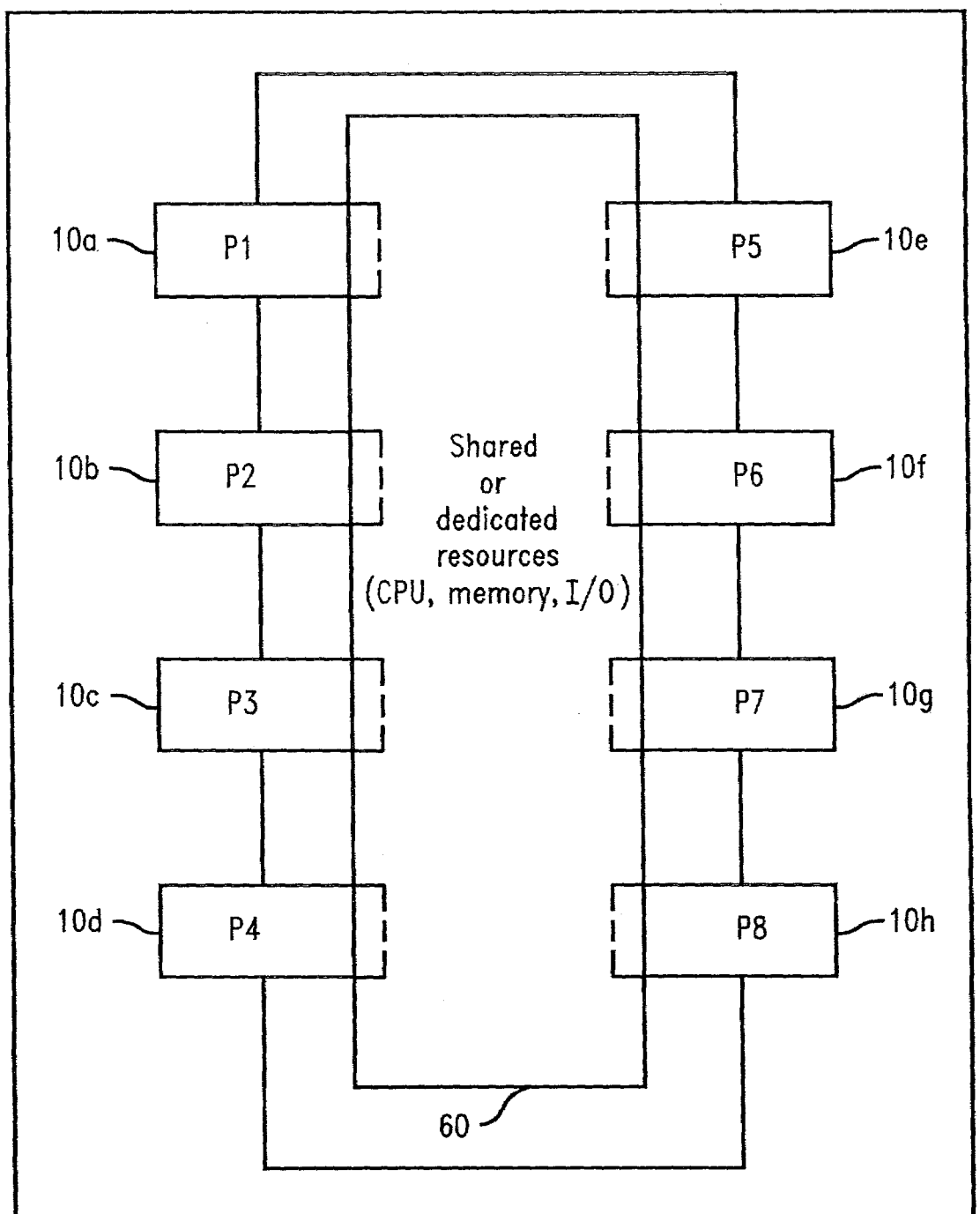
FIG. 4 is a schematic of a preferred RISC computer having hardware resources which may be repartitioned among different partitioned servers.

The critical hardware resource capacity added in step 250 may be any central processing unit (CPU) microprocessor, computer memory, storage, or other hardware resource necessary to maintain the system at steady state operation. Memory devices may include random access memory (RAM), read only memory (ROM), and nonvolatile memory (e.g., EPROM, flash memory, or battery-pack CMOS RAM). Storage includes disk such as optical (e.g., CD-ROM) or magnetic drives, or other storage media. FIG. 3 depicts one possible hardware arrangement for use with the present invention. Servers 10, 12, 14, 16 are linked to each other as a plurality of network nodes operating on the same or different platforms. Each server is linked to a plurality of client computers, i.e., server 10 is linked to clients 20a, 20b, 20c, server 12 is linked to clients 22a, 22b, 22c, server 14 is linked to clients 24a, 24b, 24c, and server 16 is linked to clients 26a, 26b, 26c. The clients may be stand-alone personal computers or limited-use network computers. The links between the various clients and servers are sufficient to transfer the types of information used on the particular network, such as the aforedescribed Internet protocols and services.

The server resource management (SRM) architecture collects data using a remote command facility (RCF) program on server 30 which works by executing UNIX commands to gather utilization data from one or more servers, such as by the scripting language known as PERL (practical extraction and report language) to issue the commands which gather the bulk of the data. The UNIX or other machine- or computer-readable program code used by the RCF may be stored on any of the storage media described above. The RCF process can use the low-impact "sockets" interface, and be extensible for executing data gathering commands on other brands of UNIX. RCF collects key server resource data including current CPU utilization, memory availability, I/O usage, and permanent storage (disk) capacity. An output file is generated containing the collected information, which can be stored locally on a hard disk drive or at a remote location, preferably not one of the servers being monitored. The RCF can provide a user interface for data collection by using conventional communications software such as a web browser that is adapted to display a page having commands or tool bars used to manage data collection. Other communications software can be used besides standard web browsers, such as those described in the '335 patent. If a server does not run a UNIX-type platform, other commands can be used to collect the data, such as those also described in the '335 patent. In the foregoing manner, key performance and capacity data from a wide variety of servers becomes web-accessible. Data collection from different servers can occur at different times, i.e., there is no need for data processing system on server 30 to be continuously connected to each of the servers.

Once the data has been collected, it can be deposited into an appropriate database as described, and optionally merged with other historical data previously collected. The collected data can then be forwarded (e.g., via FTP) to a node running an analysis program, such as the Statistical Analysis System (SAS). This software provides a programming language used to analyze data processing. The analyzed data can be presented in a variety of media or formats. In one implementation, a web browser can again be used to view the analysis, by creating an HTML file which is then placed on the network (e.g., the World Wide Web) in such a manner as to be accessible and usable by the end-user.

Going beyond merely reporting server performance, the present invention has the ability to adjust automatically capacity of the hardware resources identified as deficient by the SRM. The method of the present invention, as described in FIGS. 1 and 2, is programmed by conventional programming code in the RCF program. As shown in FIG. 3, the additional hardware resources, such as CPU, memory or disk storage 40, 42, is available to be linked to the server on command of the RCF. These additional hardware resources may be available to a plurality of servers, such as resource 42 is available to servers 12, 14, 16, or the additional hardware resources may be available to a single server, such as resource 42 is available only to servers 10. The links from the additional hardware resources to the servers are activated and connected on command by the RCF when added capacity is determined by the RCF to be needed by one or more of the servers. Thus, the method and system of present invention are able to analyze not only the utilization of the entirety of the server install base, but also exceptions at individual, single servers which require additional resources.

A preferred computer system on which to use the method of the present invention is a mid-level computer partitioned to operate as a plurality of separate servers, and capable of being re-partitioned to reallocate critical hardware resources among the different servers. This system is depicted in schematic in FIG. 4 wherein the total computer system hardware and software resources 50 are subdivided into subsystems, here showing some of such subsystems as virtual, separate servers 10a, 10b, 10c, 10d, 10e, 10f, 10g and 10h, each linked to each other for conventional network communication. The desired hardware resources which are available to be dedicated to or shared among the virtual servers, such as CPU, memory and disk storage, are shown as 60. Initially, a predetermined amount of the CPU, memory, disk storage and other hardware resource is dedicated to each virtual server. As the network operates normally under its workload, the RCF determines whether additional resource capacity is needed at one or more of the virtual servers, in accordance with the method of the present invention. The RCF then repartitions available resources 60 to add the identified critical resource to the virtual server requiring it, to restore steady state performance. A computer system having such partitionable hardware resources is under development as a RISC 6000 system from IBM Corporation, Armonk, N.Y.

The present invention automatically determines what workload is running on the computer, starts collectors based on type of workload, sets thresholds for metrics based on workload mix, determines when metrics exceed threshold (both current and projected workload), and correlates metrics to determine if hardware capacity is the cause of the problem. Additionally, the present invention automatically correlates server metrics with available middleware metrics to enable problem detection. By this method, it is possible to determine automatically if extra capacity exists, determine resource bottlenecks using historical data, add capacity if available, automatically notify people of actions taken, and provide a customer interface to set custom resource thresholds.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

We claim:

1. An automated method of managing server network computing resources having a workload of a given type, the method comprising:
   providing additional hardware resources available to, but unused by, the server network computing resources;
   providing resource data collectors for collecting data regarding performance of the server network computing resources, in accordance with the type of workload;
   developing a forecast of utilization of the server network computing resources, based on historical performance data;
   collecting real-time performance data regarding the server network computing resources running under the workload;
   analyzing the real-time performance data and the forecast to identify a critical server network computing resource; and
   automatically adjusting a capacity of the server network computing resource to provide steady-state performance of said resource under said workload.

2. The method of claim 1 further comprising setting threshold values for said performance data and identifying the server network computing resource in accordance with the threshold values.

3. The method of claim 1 further comprising:
   notifying a user of the server network computing resources when the critical resource is a hardware resource; and
   notifying the user when the capacity of said hardware resource is adjusted.

4. The method of claim 3 wherein the additional hardware resources are selected from the group consisting of CPUs, computer memory and computer disk storage.

5. The method of claim 1 wherein the additional hardware resources are selected from the group consisting of CPUs, computer memory and computer disk storage.

6. A program storage device readable by a machine, tangibly embodying a program of instructions executable by the machine to perform an automated method of managing server network computing resources having a workload of a given type, using resource data collectors for collecting data regarding performance of the server network computing resources in accordance with the type of workload, and a forecast of utilization of the server network computing resources based on historical performance data, the server network computing resources further including additional hardware resources available to, but unused by, the computing resources, said method steps comprising:
   collecting real-time performance data regarding the server network computing resources running under the workload;
   analyzing the real-time performance data and the forecast to identify a critical server network computing resource; and
   automatically adjusting a capacity of the server network computing resource to provide steady-state performance of said resource under said workload.

7. The program storage device of claim 6 wherein the method steps further comprise setting threshold values for said performance data and identifying the server network computing resource in accordance with the threshold values.

8. The program storage device of claim 6 wherein the method steps further comprise:
   notifying a user of the server network computing resources when the critical resource is a hardware resource; and
   notifying the user when the capacity of said hardware resource is adjusted.

9. The program storage device of claim 8 wherein the additional hardware resources are selected from the group consisting of CPUs, computer memory and computer disk storage.

10. The program storage device of claim 6 wherein the additional hardware resources are selected from the group consisting of CPUs, computer memory and computer disk storage.

11. A computer program product for performing an automated method of managing server network computing resources having a workload of a given type, using resource data collectors for collecting data regarding performance of the server network computing resources in accordance with the type of workload, and a forecast of utilization of the server network computing resources based on historical performance data, the server network computing resources further including additional hardware resources available to, but unused by, the server network computing resources, said computer program product having:
   computer-readable program code for collecting real-time performance data regarding the server network computing resources running under the workload;
   computer-readable program code for analyzing the real-time performance data and the forecast to identify a critical server network computing resource; and
   computer-readable program code for automatically adjusting a capacity of the server network computing resource to provide steady-state performance of said resource under said workload.

12. The computer program product of claim 11 wherein the computer program product further comprises computer-readable program code for setting threshold values for said performance data and computer-readable program code for identifying the server network computing resource in accordance with the threshold values.

13. The computer program product of claim 11 wherein the computer program product further comprises:
   computer-readable program code for notifying a user of the server network computing resources when the critical resource is a hardware resource; and
   computer-readable program code for notifying the user when the capacity of said hardware resource is adjusted.

14. The computer program product of claim 13 wherein the additional hardware resources are selected from the group consisting of CPUs, computer memory and computer disk storage.

15. The computer program product of claim 11 wherein the additional hardware resources are selected from the group consisting of CPUs, computer memory and computer disk storage.

* * * * *